(No Model.) 3 Sheets—Sheet 1.

H. T. BLAKE.
ELECTRICAL TRAMWAY.

No. 398,814. Patented Mar. 5, 1889.

Witnesses.
H. D. Nealy.
C. P. Bailey.

Inventor,
Henry T. Blake
By his Attorney Geo. D. Phillips.

(No Model.) 3 Sheets—Sheet 2.
H. T. BLAKE.
ELECTRICAL TRAMWAY.
No. 398,814. Patented Mar. 5, 1889.
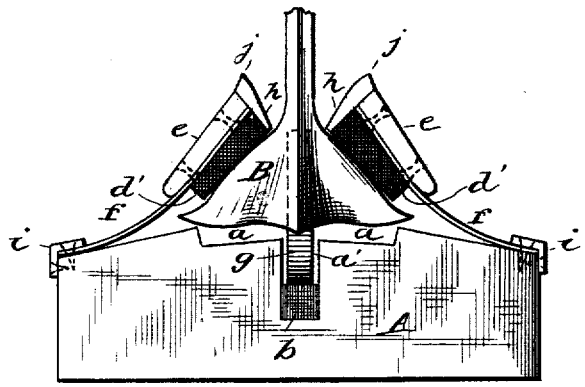
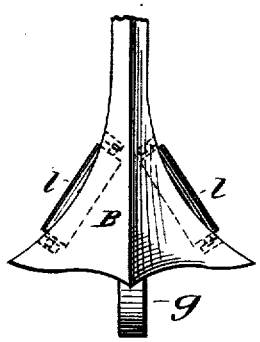
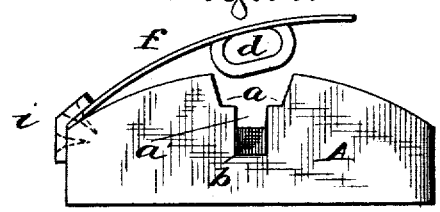
Witnesses
H. D. Nealy.
C. P. Bailey
Inventor
Henry T. Blake
By his Attorney Geo. D. Phillips (No Model.) 3 Sheets—Sheet 3.

H. T. BLAKE.
ELECTRICAL TRAMWAY.

No. 398,814. Patented Mar. 5, 1889.

Witnesses.
H. D. Nealy.
C. P. Bailey.

Inventor.
Henry T. Blake,
By his Atty.
G. D. Phillips.

UNITED STATES PATENT OFFICE.

HENRY T. BLAKE, OF NEW HAVEN, CONNECTICUT.

ELECTRICAL TRAMWAY.

SPECIFICATION forming part of Letters Patent No. 398,814, dated March 5, 1889.

Application filed November 30, 1888. Serial No. 292,222. (No model.)

*To all whom it may concern:*

Be it known that I, HENRY T. BLAKE, a citizen of the United States, residing at New Haven, in the county of New Haven and State of Connecticut, have invented certain new and useful Improvements in Electrical Tramways; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

Figure 1:
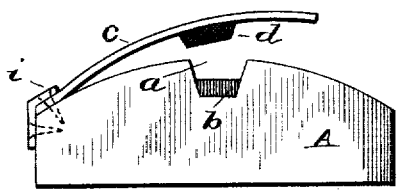
Figure 2:
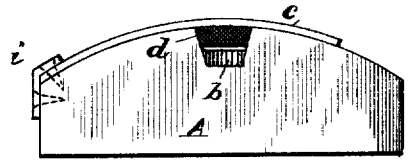

My invention relates to electrical tramways, and is an improvement of that shown in the patent granted to me May 22, 1888, No. 383,273, which consists of a base, of wood or other non-conducting material, having an electrical conductor attached to its upper surface, and a strip of flexible non-conducting material overlying said conductor in the manner as described therein. In the specification and drawings of that patent there are described and shown, Figures 12 and 15, a wooden base with an electrical conductor sunk in a channel cut in the upper surface of said base somewhat deeper than the thickness of said conductor, so that a portion of the channel is left above the surface of the conductor, and a detachable strip or cable, of rubber or other flexible non-conducting material, closely fitting said channel above said conductor like a continuous plug, and adapted to be lifted by a trolley-wheel passing under said strip or plug and replaced by a following-wheel after the trolley has passed. In Figs. 1, 2, and 11 of the same patent is shown another form of said invention, consisting of a wooden base having the conductor sunk in its upper surface, but without any channel above the conductor. This device is provided with a flexible flap overlying said conductor, which flap is joined along its outer edge to the wooden base, and is so arranged that its inner edge may be lifted by a plow-shaped trolley in order to effect electrical contact with the conductor, said flap falling back to its normal position after the trolley has passed.

In my former patents, Nos. 383,273 and 383,274, the top surface of the wooden base covered by the flaps is represented as flat. The flaps also lie in a flat position over such top surface, their highest point being lower than the edges of the side plates which hold them in place, so that a depression exists at the top of the conduit, in which moisture can collect to work its way through to the electric conductor, possibly causing leakage and short-circuiting. The metal plates which are shown in Patent No. 383,273 as overlying the upper flap, are shown and described as thin flat metal plates, whose purpose is to stiffen the flap and protect it from abrasion. In Patent No. 383,274 these plates are shown as having a flat base with an arched center overlying a flat diaphragm, and their office is described as that of a bridge over the secondary conductor, (which forms a ridge along the top of the diaphragm,) so as to prevent its accidental depression by street traffic. In both patents the flatness of the flaps and their depression below the edges of the side plates have reference to the fact that one function of the latter is to assist in supporting street traffic in its passage across the top of the conduit.

My present invention consists in constructing the top surface of the base or conduit of a rounded or roof-shaped form, thus providing a free water-shed over its entire upper surface, the conductor-channel being cut along or near the highest point thereof. The flexible flap overlying said channel is provided with overlying metal plates, whose shape will conform to the upper surface of the base or conduit, said plates being sufficiently heavy to cause the flap to closely fit said base and by their weight to hold it firmly in place.

My invention further consists in combining the two devices shown in the patent granted to me May 22, 1888, No. 383,273—viz., the flexible flap and flexible strip or plug—by attaching said strip to the under side of the flap, whereby the advantages of both forms are secured in one device, as well as other special forms of construction pertaining to the device, which will be hereinafter more fully described, and particularly pointed out in the claims.

Figure 3:
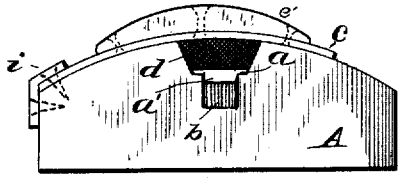
Figure 4:
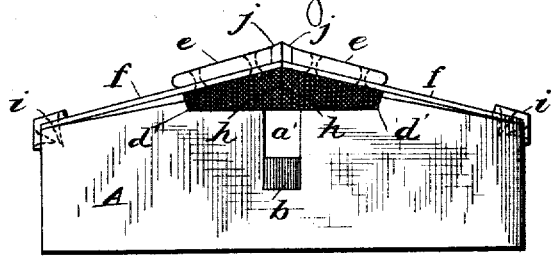
Figure 5:
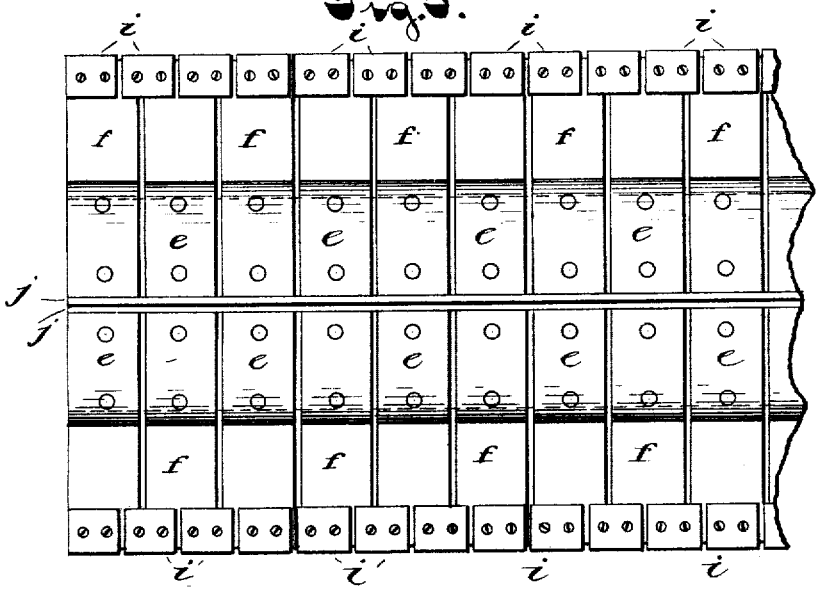
Figure 12:
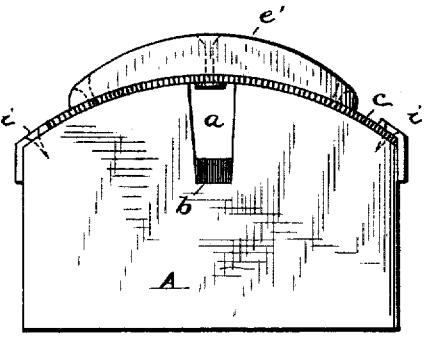
Figure 13:
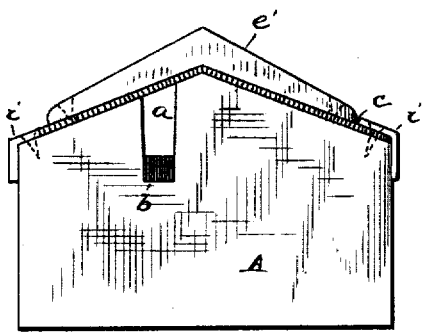
Figure 14:
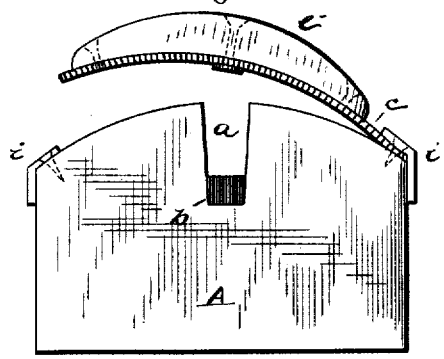
Figure 15:
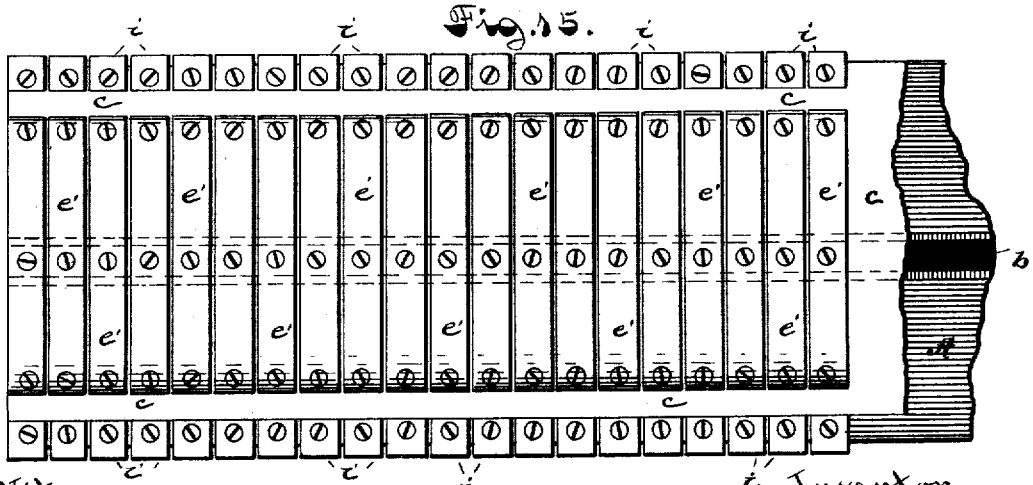

Figure 1 represents an end elevation of the device, showing the continuous strip or plug attached to the overlying flap and both elevated a short distance above the channel. Fig. 2 represents a similar view with the plug firmly seated in the channel. Fig. 3 represents an end elevation of a similar device, with the exception that in this case a double groove or channel is formed, one for the plug and one for the conductor. In other words, the channel in which the conductor rests is enlarged in its upper part or mouth, and into such enlarged portion the strip or plug is fitted, said flap being also provided with weighting-plates. Fig. 4 represents an end elevation of a conduit similar in construction to the one shown in Fig. 3, except that the flexible plug instead of being in one piece is longitudinally divided in two parts, each part attached to an independent overlying flap, the outer ends of which are fastened to the conduit or base and the inner ends meeting or abutting at the center. Said flaps are in sections and weighted with iron plates properly insulated from each other. Fig. 5 represents a plan view of Fig. 4. Fig. 6 represents an end elevation of Fig. 4, showing the operation of the trolley in lifting the flaps and plugs. Fig. 7 represents a plow-shaped trolley provided with anti-friction rollers situated in the sides of said trolley to engage with the ends of the strips or plugs. Fig. 8 is a detail view. Figs. 8, 9, 10, and 11 represent modified forms of the channel-closing flexible strip or plug. Fig. 12 represents a base or conduit, whose upper surface is rounded similar to the one shown in Fig. 1. The flexible flap, instead of being in sections, as in Fig. 4, is one continuous strip fastened by one of its edges to the base, said flap being surmounted by heavy weighting-plates whose under surface conforms to the upper rounded surface of the base or conduit. Fig. 13 represents a device somewhat similar to Fig. 12, except that the upper surface of the conduit is angular or roof-shaped, the weighting-plates conforming to the shape of the conduit. The conductor-channel in this view is shown as cut at one side of the center of the conduit. Fig. 14 represents the end elevation, as seen at Fig. 12, with the flap slightly raised to admit the contact-making device. Fig. 15 represents a plan view of Figs. 12 and 14.

Its construction and operation are as follows:

A represents the wooden base or sleeper; $a$, the channel cut therein; $b$, the conductor-strip placed in the said channel; $c$, overlying flexible flaps; $d\ d'$, longitudinal flexible strips closing the mouth of the conductor-channel; $e\ e'$, weighting-plates attached to the flaps; $f$, short section-flaps; B, plow-shaped trolley; $g$, wheel for same; $l$, anti-friction rollers; $i$, clamping-plates.

Figs. 1 and 2 show a V-shaped channel-groove, and at the bottom is placed the conductor $b$. The longitudinal flexible plug-shaped strip $d$ is attached to the under side of the overlying flap $c$ and closely fits the sides of the mouth of said channel above said conductor and effectually excludes all moisture and foreign matter therefrom.

In Fig. 5 the same V-shaped channel is employed so far as it relates to the flexible strip or plug $d$; but at the bottom of said groove or channel is cut a second channel, $a'$, preferably narrower than the upper or V-shaped one, and into this second channel, at the bottom thereof, is placed the conductor $b$. This latter method may be preferred in some cases where a more perfect isolation of the conductor is required, as the flexible strip $d$ can in this case be made wider and thus cover more surface.

In Fig. 4 the same double channel is employed, as above described; but I may prefer in some cases to divide this flexible strip or plug longitudinally through its center, thus forming the two independent strips $d'\ d'$, each a counterpart of the other, but forming, to all appearance, when closed and their ends $h\ h$ firmly abutting each other, a solid plug. Each half $d'\ d'$ of this divided plug is attached to the flexible flaps $f$, whose outer edges are secured to the base A by means of insulated iron plates $i$. These flaps are preferably made in sections, (see plan view, Fig. 5,) so as to enable them to be readily raised by the lifting device. On the inner ends of said flaps and overlying the same are the iron plates $e$, which serve the double purpose of protecting the said flaps and also of weighting down the divided plug. This flexible strip or plug can be made in any form desired or best suited to the required demands. The V-shaped form, with the corresponding V-shaped groove in the base or sleeper A, will insure a close joint and can be readily disengaged therefrom by the action of the trolley or other lifting device.

In Fig. 10 the plug is of a tubular form, the sides $m$ being rounded. In Fig. 11 is shown a similar construction of the flexible strip $d$, but in shape nearly oval. I prefer in the divided plug to face the ends of the iron plates $e$ with an elastic non-conducting material, $j,j$, to assist in making a close joint in the center or point of meeting. This facing may extend down the entire face of the two parts $d'\ d'$ of the divided plug, or, if so desired, simply cover the ends of the iron plates, as shown at Fig. 4. The two parts $d'\ d'$ may each have on their inner faces the projection $k$. (Shown in Fig. 9.) This projection will form an integral part of the same, thus serving to face the ends of irons $e$ in place of the pieces $j,j$.

The longitudinal strip can be made of any flexible non-conducting material. If rubber is used and too much friction is produced by the action of the trolley in contact therewith, said strip may be faced with leather or other frictionless non-conducting material. To still further reduce this friction, should it exist to any appreciable extent, anti-friction rollers $l\ l$ may be set into the sides of the plow-shaped trolley, as seen at Fig. 7.

Instead of leaving the top of the conduit flat I give it a rounded or roof-shaped form, the channel being cut along or near the highest part, so as to shed freely all water that may fall upon it without obstruction from the side plates, these being placed below the highest part of the conduit, and in order to retain the flap in this curved shape and to promote the closeness of its fit I attach firmly to its upper surface (see Figs. 12, 13, 14, and 15) heavy metal plates $e'$, curved or bent in their vertical section, so as to correspond with the rounded or roof-shaped top of said conduit or wooden base. These plates extend nearly across the whole distance between the side plates, $i\ i'$, but not so as to prevent the flexibility of the flap, and are set as closely together as may be practicable without destroying such flexibility. (See Fig. 15.) From a quarter of an inch to an inch or more would no doubt give the desired result. These plates are made as heavy as practicable in order to act as weights upon the flap, so as to hold it firmly in position and cause it to drop quickly and heavily into place after the trolley has passed.

In a conduit constructed as above described—viz., of a rounded or roof-shaped form with a flap conforming thereto by means of the properly-curved weighting-plates and a suitable contact-making device—it will be necessary to raise the flap but a short distance above the surface of the conduit, thereby greatly lessening the chances of water or other foreign matter finding its way into the conductor-channel during the passage of the trolley or other contact-making device, thus affording a much better protection for the conductor than would be the case if the top of the conduit were flat. Another important advantage derived from these features of construction above described relates to the capacity of the whole structure to support the wear and tear incidental to street traffic. The curved shape of the weighting-plates and the flap in correspondence with the rounded top of the base not only distributes the pressure of such traffic over the whole top of the conduit, but makes it impossible for the plates or flap to be wrenched or torn from their places by the twisting action of a wheel of a heavily-loaded wagon, especially as the tops of said weighting-plates being also curved such a wheel can get no gripping-hold upon them, nor can it twist off the side plates by getting between them, as in my former patent. Thus this form of conduit is made practically available in streets where heavy traffic is used, and where without these improvements it would be practically unavailable.

The device, as shown and described, it is thought, will meet all the requirements essential to a ground-conduit for electrical tramways, the flap being easily lifted and replaced, and making, when closed, a sufficiently tight joint, thus excluding from the conductor-channel all foreign matter. The cable or strip is not merely a cover, but in addition a plug or stopper fitting into the mouth of the groove or channel, and serving not only to exclude wet and dirt, but to hold the flap firmly in its proper position, especially when pressed into place by weighting-plates on the upper side thereof.

Having thus described my invention, what I claim as new, and desire to secure by Letters Patent, is—

1. An electrical conductor-conduit composed of a base, of wood or other non-conducting material, a metallic electrical conductor-strip laid in said base below its upper surface, a depression or channel in said base above said conductor, a strip or flap of flexible non-conducting material attached by one of its edges along the upper surface of said base and overlying said channel, and a strip of flexible non-conducting material attached to the under side of said flap and filling the mouth of said channel as a continuous plug and adapted to be lifted by a plow-shaped trolley, or by any other suitable device acting upon said plug or flap, all in the manner as described.

2. The devices described and shown as a covering for any slotted conduit, consisting of a flap of flexible material attached along one of its edges to the upper surface of said conduit, so as to cover such slot, a strip of flexible material attached to the under side of such flap and closing the slot of the conduit as a continuous plug and adapted to be lifted and replaced in the manner shown and described, and weighting-plates attached to the upper side of the flap, all as shown and described.

3. A conduit for an electrical railway and other uses, consisting, first, of a base, of wood or other suitable non-conducting material, having its upper surface rounded or roof-shaped, and having a channel cut in said upper surface, at the bottom of which the electric conductor is laid; second, a flexible flap overlying said upper surface and attached thereto along one of its edges, and, third, weighting-plates secured to said flap, which extend across said channel and whose under surface conforms to the curved or roof-shaped surface of said base, and thereby causes the said flap to conform, when in position, to such shape, so as to form a curved, roof-shaped, or sloping covering over said base, which is held in place by said weighting-plates, except when lifted by the passage of the trolley, all in the manner and for the purpose described.

In testimony whereof I affix my signature in presence of two witnesses.

HENRY T. BLAKE.

Witnesses:
 HENRY C. WHITE,
 J. KINGSLEY BLAKE.